United States Patent
Schneid

(10) Patent No.: US 6,257,427 B1
(45) Date of Patent: Jul. 10, 2001

(54) MODULAR ASSEMBLY-TYPE STAND WITH EARTHQUAKE-PROOF RETENTION MEANS, PARTICULARLY FOR STORAGE BATTERIES AND THE LIKE

(75) Inventor: Hans Jorg Schneid, Eich Rheinland-Pfalz (DE)

(73) Assignee: Passoni Paolo E Figli S.r.l., Brugherio (IT)

( * ) Notice: Subject to any disclaimer, the term of this patent is extended or adjusted under 35 U.S.C. 154(b) by 0 days.

(21) Appl. No.: 09/380,569

(22) PCT Filed: Jan. 5, 1999

(86) PCT No.: PCT/EP99/00010

§ 371 Date: Oct. 25, 1999

§ 102(e) Date: Oct. 25, 1999

(87) PCT Pub. No.: WO99/36973

PCT Pub. Date: Jul. 22, 1999

(30) Foreign Application Priority Data

Jan. 13, 1998 (IT) .............................................. MI98A0038

(51) Int. Cl.[7] .................................................. A47B 57/00
(52) U.S. Cl. ............................................................ 211/189
(58) Field of Search ..................................... 211/189, 182, 211/191

(56) References Cited

U.S. PATENT DOCUMENTS

| 2,784,812 | * | 3/1957 | Kindorf ................................ 211/182 |
| 3,463,325 | * | 8/1969 | Zagotta et al. ....................... 211/189 |
| 4,078,664 | * | 3/1978 | McConnell .......................... 211/189 |
| 5,016,765 |   | 5/1991 | Leonardo . |

FOREIGN PATENT DOCUMENTS

| 0 085 744 | 8/1983 | (EP) . |
| 88 06805  | 9/1988 | (WO) . |

* cited by examiner

*Primary Examiner*—Alvin Chin-Shue
*Assistant Examiner*—Sarah Purol
(74) *Attorney, Agent, or Firm*—Daniel O'Byrne

(57) ABSTRACT

A modular assembly-type stand with earthquake-proof retention means, particularly for storage batteries and the like, comprising a supporting framework (1) provided with supporting side plates (2) joined by stringers (3,5) which form a region for supporting storage batteries and the like, and a retention frame (10) which is supported by the supporting framework (1) and can be secured against a median portion of the vertical extension of the storage batteries supported by the stringers. (FIG. 1)

10 Claims, 5 Drawing Sheets

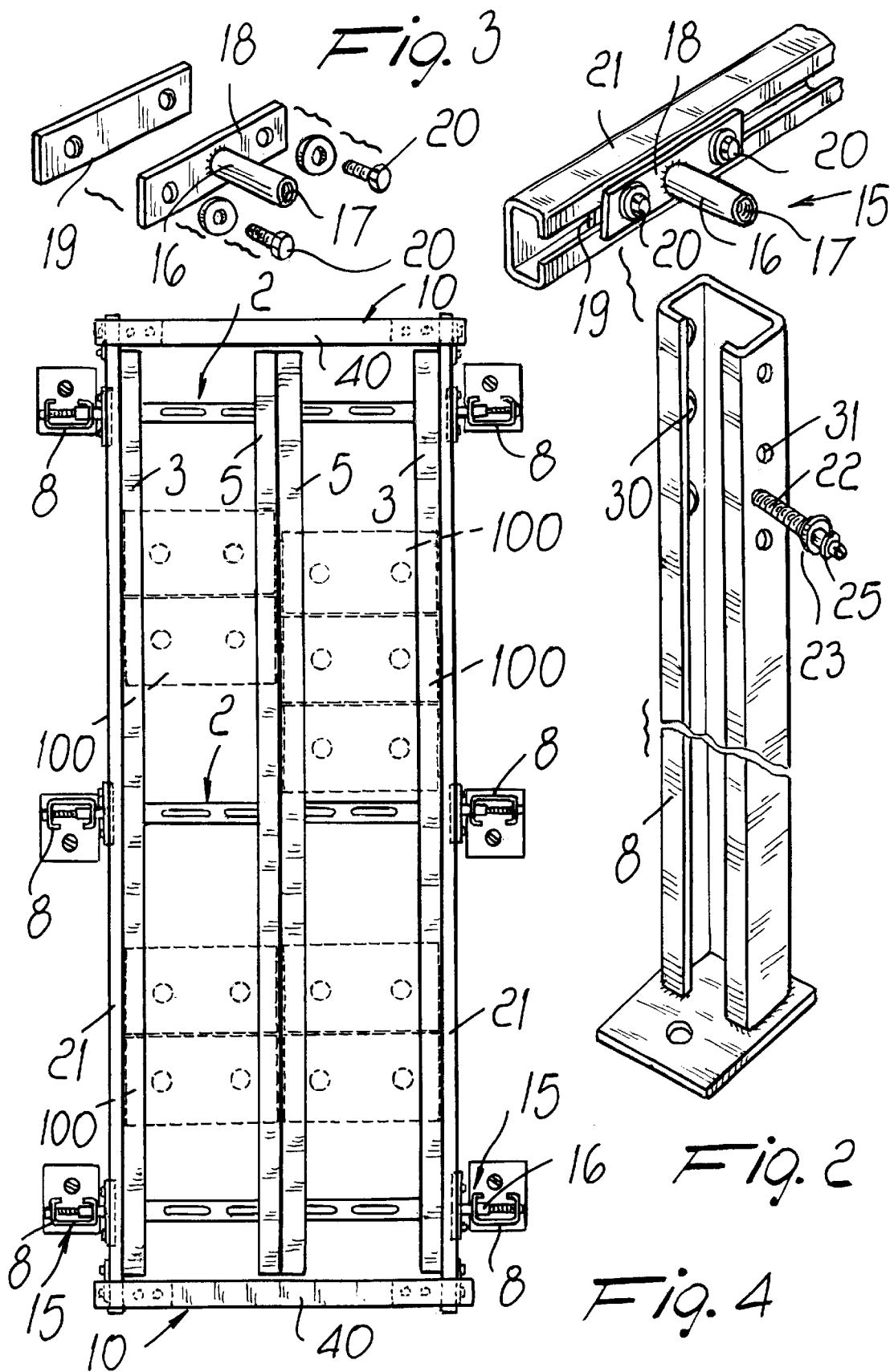

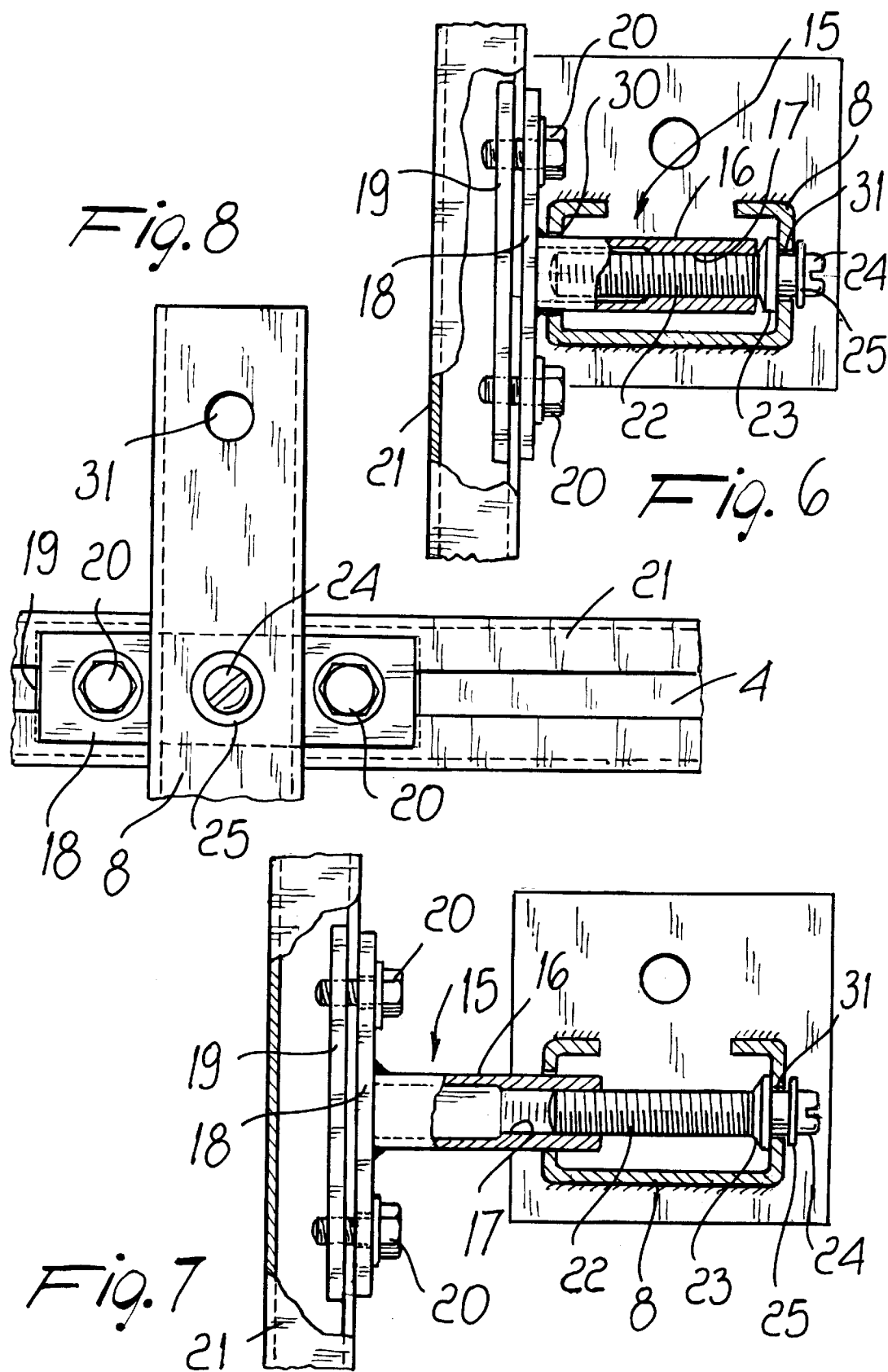

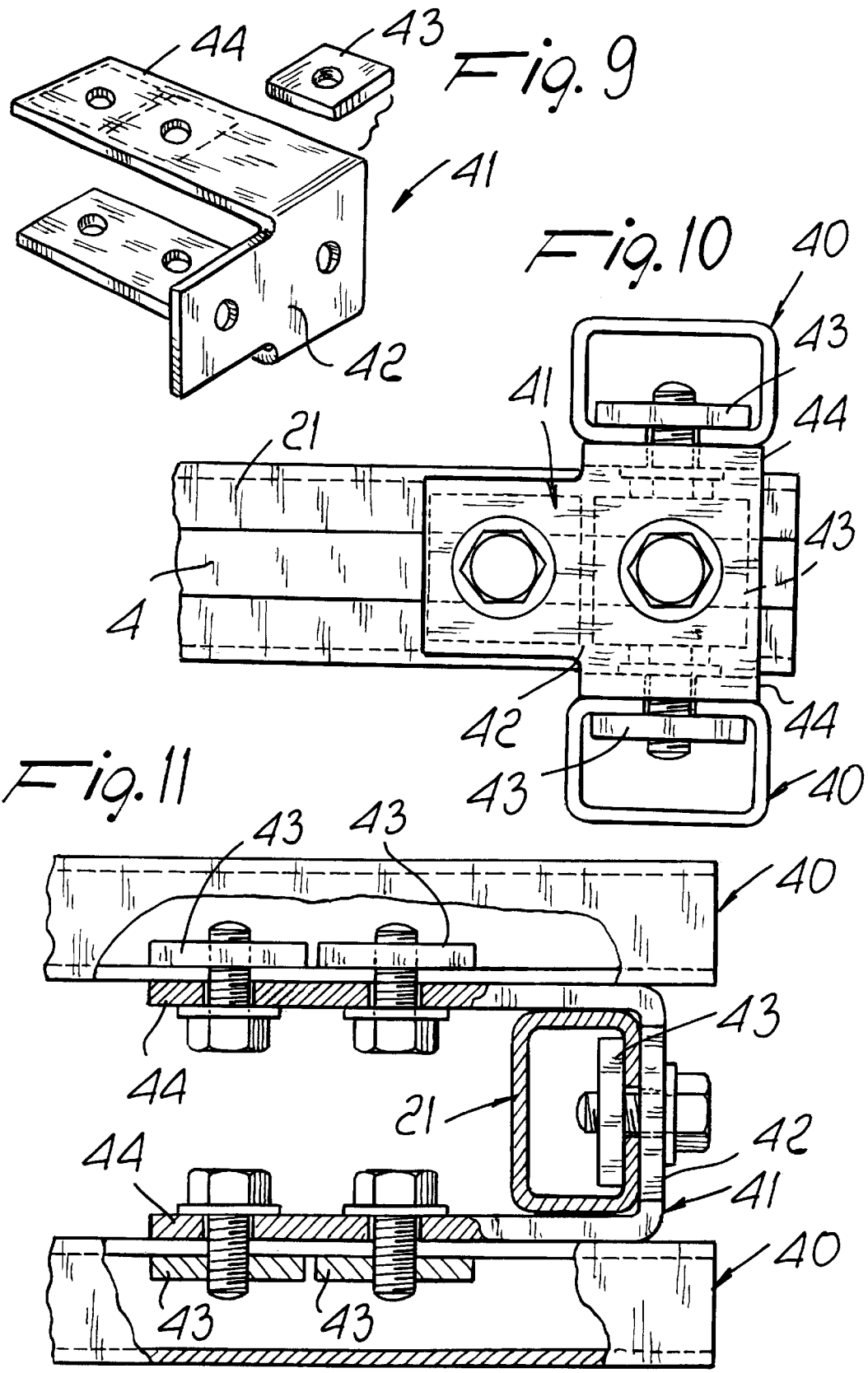

MODULAR ASSEMBLY-TYPE STAND WITH EARTHQUAKE-PROOF RETENTION MEANS, PARTICULARLY FOR STORAGE BATTERIES AND THE LIKE

BACKGROUND OF THE INVENTION

The present invention relates to a modular assembly-type stand with earthquake-proof retention means, particularly for storage batteries and the like.

A currently strongly felt problem in all industrial fields which use arrays of storage batteries is related to the provision of supporting stands which in addition to being stable and safe are simple to provide.

Conventional solutions usually required long execution times and did not have a good versatility which allowed to modify said stands according to different requirements of use.

EP 0085744, assumed included herein as reference, has solved this problem by providing modular assembly-type stands which substantially comprise supporting side plates provided by means of a box-like body which is provided with through openings on the upper edges which are arranged substantially at right angles to the plane of arrangement of the side plates. Bolts engage the through openings to lock stringers which have a substantially polygonal transverse cross-section and are provided with a longitudinal slot which allows engagement with the bolts in any point of their longitudinal extension.

This type of stand has excellently solved the problem of supporting storage batteries in all normal installation conditions, but it has been found to be susceptible of improvements particularly as regards the additional earthquake-proof protections that must be used if the stands are to be installed in regions highly at risk for earthquakes.

The earthquake-proof retention means currently used in all modular stands have not been engineered so as to allow easy and quick application in all operating conditions; accordingly, even now the earthquake-proof means must in practice be designed and provided for each individual case according to methods certainly considered as being at the craft level.

SUMMARY OF THE INVENTION

The aim of the present invention is to eliminate the above-cited drawbacks, providing a modular assembly-type stand with earthquake-proof retention means, particularly for storage batteries and the like, which can be easily installed in all operating conditions without requiring adaptations to be performed at the installation site.

Within the scope of the above aim, a particular object of the present invention is to provide a modular stand wherein earthquake-proof retention means are available which can be easily and quickly installed and adapted to the various kinds of accumulator without thereby having to resort each time to specific designs and constructions.

Another object of the present invention is to provide a system which can be used with most currently commercially available storage batteries and can also be obtained as a kit which remains available for immediate use by the user.

Another object of the present invention is to provide a modular stand wherein the earthquake-proof retention means can be obtained with parts which are substantially of the same kind used to provide said stand.

Another object of the present invention is to provide a modular stand which thanks to its particular constructive characteristics is capable of giving the greatest assurances of reliability and safety in use and is also competitive from a logistic and economic point of view.

This aim, these objects and others which will become apparent hereinafter are achieved by a modular assembly-type stand with earthquake-proof retention means, particularly for storage batteries and the like, comprising a supporting framework provided with supporting side plates joined by stringers forming a region for supporting storage batteries and the like, characterized in that it comprises a retention frame which is supported by said supporting framework and can be secured against at median portion of the vertical extension of said storage batteries supported by said stringers.

BRIEF DESCRIPTION OF THE DRAWINGS

Further characteristics and advantages of the present invention will become apparent from the following detailed description of a preferred but not exclusive embodiment of a modular assembly-type stand with earthquake-proof retention means, particularly for storage batteries and the like, illustrated only by way of non-limitative example in the accompanying drawings, wherein:

FIG. 2 is a perspective view of the telescopic means for securing the earthquake-proof means;

FIG. 3 is a schematic perspective view of the bush and of the contrast plate of the telescopic securing means;

FIG. 4 is a top plan view of a modular stand;

FIG. 6 is a partially sectional top plan view of the telescopic securing means in the retracted position;

FIG. 7 is a partially sectional top plan view of the telescopic securing means in the extracted position;

FIG. 8 is a front view of the telescopic securing means;

FIG. 9 is a perspective view of the bracket for connecting the lateral bars;

FIG. 10 is a front view of the lateral bars connected to the front bar;

FIG. 11 is a partially sectional side view of the connection between the side bars and the front bar.

DESCRIPTION OF THE PREFERRED EMBODIMENTS

Figure 1:
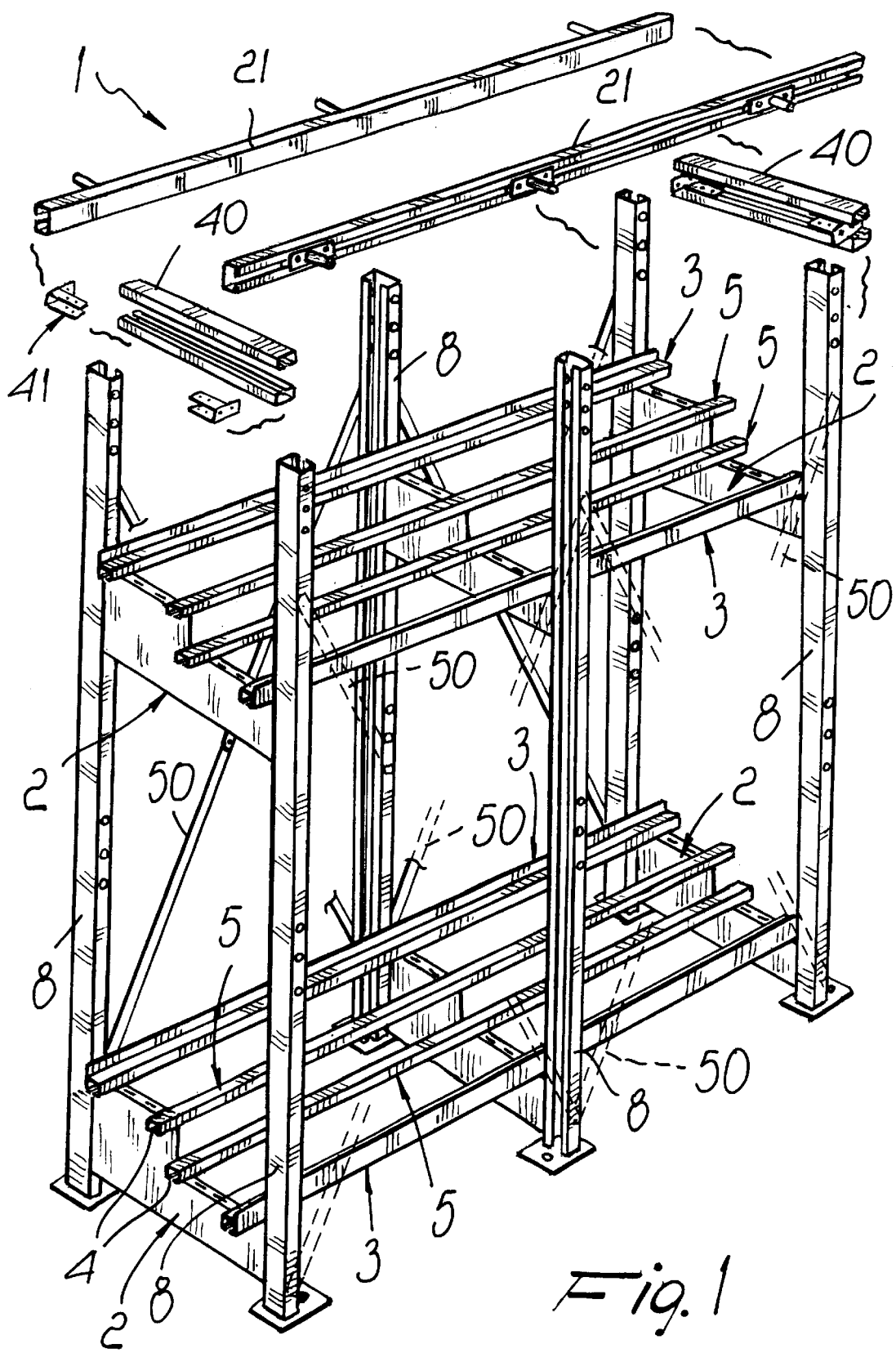
FIG. 1 is a schematic perspective view of an embodiment of a modular stand with the earthquake-proof retention means shown in an exploded view, according to the present invention.
Figure 5:
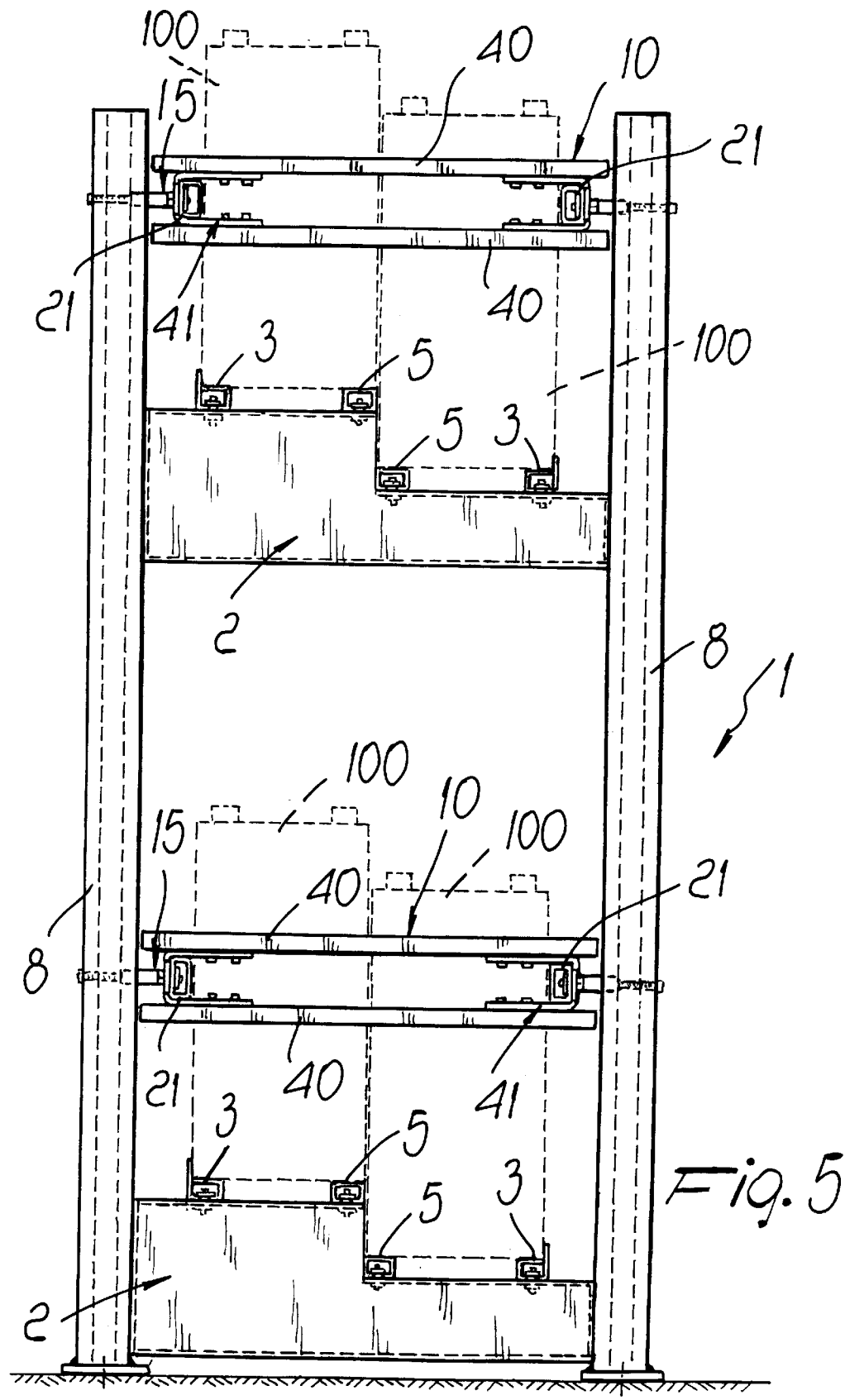
FIG. 5 is a lateral elevation view of a modular stand according to the present invention.

With reference to the above figures, the modular assembly-type stand with earthquake-proof retention means, particularly for storage batteries and the like, according to the present invention comprises a supporting framework, generally designated by the reference numeral 1, which can be provided with one shelf plane or with two or more shelf planes with stacked groups of storage batteries.

Generally speaking, the supporting framework 1 is constituted by supporting side plates 2 which are of the type disclosed in the above-cited EP 0085744 and can form a step-like configuration or a substantially flat configuration in their upper region.

The side plates 2 are joined by stringers which form the supporting region for the storage batteries 100.

More specifically, there are provided outer stringers, designated by the reference numeral 3, which have an H-shaped transverse cross-section with a longitudinal slot 4, and there are provided inner stringers 5, which are substantially C-shaped with a longitudinal slot, again designated by the reference numeral 4, which allows to couple the bolts for securing to the side plates and for the side-by-side connection of multiple stringers in order to obtain modular stands of the intended length.

The particularity of the present invention consists in that there is provided a retention frame, generally designated by the reference numeral 10, which is connected to the supporting framework 1 and can be secured against a median portion of the vertical extension of the storage batteries supported by the stringers 3 and 5.

The retention frame 10 is advantageously connected to uprights 8 of the supporting framework which are associated with the side plates and have, in plan view, a C-like shape with holes formed on the opposite narrower sides.

More specifically, telescopic securing means, generally designated by the reference numeral 15, engage the uprights and are constituted by a bush 16, with an internal thread 17, which protrudes from a plate 18 which, by means of a contrast plate 19 and of securing screws 20, allows to connect front bars 21 which are also C-shaped.

A pusher screw 22 engages the thread 17 of the bush 16 and is provided with an abutment 23.

The bush 16 can be inserted in wider holes 30 formed on the narrower side of the upright which is directed toward the accumulator supporting region, while on the opposite narrower side there are provided narrower holes 31 through which the head 24 for actuating the pusher screw 22 passes but the abutment 23 does not pass, acting against the inner edge of the uprights.

A retaining ring 25 is also provided, which can be applied at a later time and prevents the accidental extraction of the pusher screw.

This arrangement allows, by acting on the actuation head 24, to move the front bars 21, which engage the array of storage batteries and to secure the retention frame against the array of storage batteries with a securing action which can be performed simply by acting on the actuation head 24.

In a lateral region transverse bars are provided, designated by the reference numeral 40, which connect to the front bar 21 by means of a bracket 41, shown more clearly in FIG. 9, which has a central portion 42 which, by means of screws and contrast plates 23, can be connected to the longitudinal slot, again designated by the reference numeral 4, of the front bar 21. Wings 44 protrude from the central portion 42 and are arranged at right angles to said central portion 42. By means of contrast plates 43, said wings allow coupling, by conventional securing screws or bolts, to the lateral bars 40, whose transverse cross-section is similar to that of the front bars, the only difference being that the narrower sides of the transverse bars engage the lateral parts of the storage batteries arranged laterally.

The assembly is completed by diagonal reinforcement braces 50 which are provided by means of bar segments which can be connected to each other and are arranged in an X-shaped configuration so as to join two laterally adjacent uprights at the front part and at the rear part of the stand.

In this manner, a retention frame is provided which can be assembled easily and quickly and can be arranged around the storage batteries, constituting an excellent earthquake-proof retention means thanks to its connection to the supporting framework and of the possibility to secure the front bars against the array of storage batteries, utilizing the presence of the telescopic pusher means.

From the above description it is thus evident that the present invention achieves the intended aim and objects, and in particular the fact is stressed that a modular stand is provided in which there are provided earthquake-proof retention means which can be quickly adapted to all kinds of accumulator and to the different dimensions of the arrays of accumulators to be retained, without thereby having to perform adaptations in each case.

The invention thus conceived is susceptible of numerous modifications and variations, all of which are within the scope of the inventive concept.

Moreover all the details may be replaced with other technically equivalent elements.

In practice, the materials employed, as well as the contingent shapes and dimensions, may be any according to requirements.

The disclosures in Italian Patent Application No. MI98A000038 from which this application claims priority are incorporated herein by reference.

What is claimed is:

1. A modular assembly-type stand with earthquake-proof retention means, particularly for storage batteries and the like, comprising a supporting framework provided with supporting side plates connected to uprights, said supporting side plates being joined by stringers forming a region for supporting storage batteries and the like, the stand further comprising a retention frame which is supported by said uprights of said supporting framework in a position above said side plates so that said retention frame is securable against a median portion of the vertical extension of said storage batteries supported by said stringers.

2. The modular stand according to claim 1, wherein said retention frame is rigidly associated with said uprights which form said supporting framework and which are rigidly fixed to said supporting side plates.

3. The modular stand according to claim 1, wherein said retention frame comprises front bars which can be secured against said storage batteries and transverse bars which join a forward front bar and a rear front bar of said front bars and can be arranged laterally adjacent to sides of the array of said storage batteries.

4. A modular assembly-type stand with earthquake-proof retention means, particularly for storage batteries and the like, comprising a supporting framework provided with supporting side plates joined by stringers forming a region for supporting storage batteries and the like, comprising a retention frame which is supported by said supporting framework and can be secured against a median portion of the vertical extension of said storage batteries supported by said stringers, said retention frame comprising front bars which can be secured against said storage batteries and transverse bars which join a forward front bar and a rear front bar and can be arranged laterally adjacent to sides of the array of said storage batteries, the modular stand further comprising telescopic securing means for the translatory motion of said front bars.

5. The modular stand according to claim 4, wherein said telescopic securing means comprise a bush with an internal thread which is associated with a plate coupleable, by means of a contrast plate and of securing screws, to said front bars, said front bars having a C-shaped transverse cross-section with a longitudinal slot, a pusher screw engaging said thread of said bush and acting on said uprights by abutment.

6. The modular stand according to claim 5, wherein said uprights have a C-shaped transverse cross-section and form, on a narrower side directed towards said storage batteries, wider holes for the sliding passage of said bush, narrower holes being formed on the opposite narrower side of said uprights for the passage of an actuation head for the actuation of said pusher screw which is provided with an abutment which acts against said uprights.

7. The modular stand according to claim 6, further comprising a retention ring coupleable to said actuation head in order to prevent the accidental extraction of said pusher screw from the upright.

8. The modular stand according to claim 3, further comprising brackets which are associated with said front bars in order to connect said transverse bars.

9. A modular assembly-type stand with earthquake-proof retention means, particularly for storage batteries and the like, comprising a supporting framework provided with supporting side plates joined by stringers forming a region for supporting storage batteries and the like, comprising a retention frame which is supported by said supporting framework and can be secured against a median portion of the vertical extension of said storage batteries supported by said stringers, said retention frame comprising front bars which can be secured against said storage batteries and transverse bars which join a forward front bar and a rear front bar and can be arranged laterally adjacent to sides of the array of said storage batteries, the modular stand further comprising brackets which are associated with said front bars in order to connect said transverse bars, and said brackets having a central portion for fixing to the longitudinal slot of the corresponding front bar, wings extending from said central portion at right angles thereto and being able to engage said transverse bars by means of contrast plates and securing screws.

10. A modular assembly-type stand with earthquake-proof retention means, particularly for storage batteries and the like, comprising a supporting framework provided with supporting side plates joined by stringers forming a region for supporting storage batteries and the like, comprising a retention frame which is supported by said supporting framework and can be secured against a median portion of the vertical extension of said storage batteries supported by said stringers, said retention frame comprising front bars which can be secured against said storage batteries and transverse bars which join a forward front bar and a rear front bar and can be arranged laterally adjacent to sides of the array of said storage batteries, said transverse bars having a C-shaped transverse cross-section with a longitudinal slot, said transverse bars acting against the lateral sides of the arrays of storage batteries at a narrower edge, a pair of mutually opposite lateral bars acting on each side of said array of storage batteries.

* * * * *